(12) United States Patent
Seo

(10) Patent No.: US 7,745,538 B2
(45) Date of Patent: Jun. 29, 2010

(54) POLYMER COMPOSITE, FILM THEREOF AND SEPARATION MEMBRANE MADE THEREFROM

(76) Inventor: Yongsok Seo, 190 44-1302 Hyundae Apartment Okumdong, Songpaku, Seoul (KR) 138-740

( * ) Notice: Subject to any disclaimer, the term of this patent is extended or adjusted under 35 U.S.C. 154(b) by 897 days.

(21) Appl. No.: 10/591,057

(22) PCT Filed: Feb. 16, 2005

(86) PCT No.: PCT/KR2005/000425

§ 371 (c)(1),
(2), (4) Date: Aug. 30, 2006

(87) PCT Pub. No.: WO2006/046795

PCT Pub. Date: May 4, 2006

(65) Prior Publication Data

US 2007/0185264 A1    Aug. 9, 2007

(30) Foreign Application Priority Data

Oct. 26, 2004    (KR) ...................... 10-2004-0085643

(51) Int. Cl.
C08L 23/00 (2006.01)
C08L 27/12 (2006.01)
C08L 39/04 (2006.01)
C08L 9/00 (2006.01)
D06C 3/00 (2006.01)
B01D 61/00 (2006.01)
B01J 20/28 (2006.01)

(52) U.S. Cl. ........................ 525/191; 525/199; 525/205; 525/207; 525/212; 525/232; 525/240; 525/241; 427/172; 210/650; 502/4

(58) Field of Classification Search ................. 525/191, 525/203, 205, 232, 240, 241, 207, 199, 212; 427/172; 210/650; 502/4
See application file for complete search history.

(56) References Cited

U.S. PATENT DOCUMENTS 6,397,912 B1 * 6/2002 Watanabe et al. ........... 152/510

* cited by examiner

Primary Examiner—Nathan M Nutter
(74) Attorney, Agent, or Firm—Rabin & Berdo, P.C.

(57) ABSTRACT

Polymer composite including a compatibilizer and having selective permeability to chemical permeants due to interaction differences between the compatibilizer and the chemical permeants, includes 50-99 wt % of an amorphous thermoplastic resin selected from the group polyethylenepropylendienterpolymer, poly(1-(trimethylsilyl)-1-propyne), amorphous nylon, polystyrene and polycarbonate; 0.9-50 wt % of a semi-crystalline polymer selected from the group polyamide (nylons), polyethylene terephthalate, polybutylene terephthalate, polyethylene, polypropylene, polyetheretherketone, polyvinylidene fluoride, polytetrafluoroethylene, polyphenylene sulfide, and thermotropic or lyotropic liquid crystal polymer, and dispersed in the amorphous thermoplastic resin to provide a dispersed phase having an interface with the amorphous thermoplastic resin; and 0.1-10 wt % of a compatibilizer positioned at the interface of the dispersed phase with the amorphous thermoplastic resin and having different interactions with different chemical permeants so that the selective permeability of the polymer composite is affected.

27 Claims, 1 Drawing Sheet

[Fig. 1]
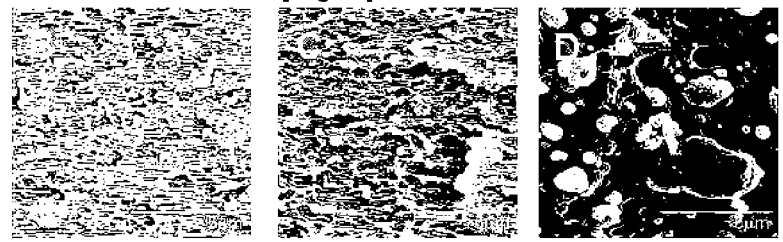
[Fig. 2]
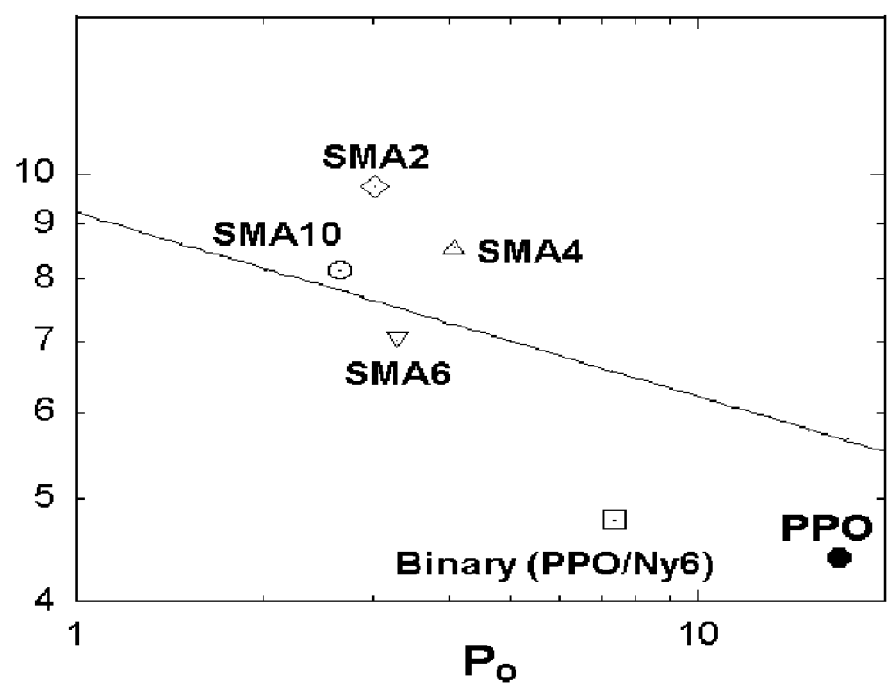

POLYMER COMPOSITE, FILM THEREOF AND SEPARATION MEMBRANE MADE THEREFROM

BACKGROUND OF THE INVENTION

1. Field of the Invention

The present invention relates to a polymeric composite separation membrane and its preparation method. The separation membrane of the present invention is produced by blending an amorphous thermoplastic resin, a semi-crystalline polymer and a compatibilizer which controls the dispersion state of the semi-crystalline polymer in the thermoplastic resin and adhesion at the interface. Then, a thin film of the blended mixture is prepared which is capable of increasing a selective permeation rate in such a manner that the dispersed semi-crystalline polymer is morphologically altered to serve as an obstacle to permeation, by which the permeation distance of chemicals (liquid or gases) is extended. When applied to a gas separation process, this enhances the selective permeability over the so-called trade-off limit. More particularly, a semi-crystalline polymer, which is hardly permeable to a gas or chemicals, is dispersed in an amorphous thermoplastic resin, and at this time, an appropriate amount of compatibilizer is added so that the semi-crystalline polymer has a uniform size and is in a well-dispersed state. Then, the mixture obtained from an extruder is passed through a die as a thin film, whereby, the semi-crystalline polymer phase is evenly dispersed and morphologically controlled in the film, and works as an obstacle to diffusion of chemicals or gases, to thereby morphologically altering path length of permeants. The chemicals or gases are separated according to interaction difference between the compatibilizer and permeant molecules, which induces diffusion time difference during which they pass the deformed path by the diffusion constant difference depending on the size of the chemicals or gas molecule and the interaction with the compatibilizer, thereby exhibiting a highly superior selectivity.

2. Description of the Related Art

Polymeric separation membranes are used for various separation processes which are technologically important, such as liquid separation, drug delivery, drug release, artificial kidney and lung, separation of air, separation of carbon dioxide from a natural gas, or separation of nitrogen and oxygen, or separation of hydrocarbon and hydrogen in a petrochemical process.

In the gas separation process, the basic factors determining the separation performance of polymeric gas separation membranes for a pair of gases, i.e., oxygen/nitrogen, carbon dioxide/methane or hydrogen/nitrogen, etc., are permeability constant and selectivity. Permeability constant is typically obtained by dividing the multiplied value of a gas concentration difference and the thickness of separation membrane by a pressure difference on both sides of the separation membrane. Selectivity is a ratio of permeability of two gases. That is, when the selectivity ratio is represented by A/B, 'A' is the permeability of the high permeable gas and 'B' is the permeability of the low permeable gas.

High performance separation membranes are desired to have a high permeability and a high selectivity, because a high permeability allows reduction of the area of separation membranes required for separating a certain amount of gas or chemicals and a high selectivity allows enhanced purity of product.

However, generally, if a separation membrane has a high permeability, it has a low selectivity, whereas if a separation membrane has a high selectivity, it has a low permeability.

According to Robeson's observation, as to separation of several pairs of gases, most polymer separation membranes have a negative slope in the correlation between the selectivity and the permeability (see *Journal of Membrane Science*, Vol. 62, 165, 1991, USA). That means the selectivity is reduced as the permeability is increased.

In addition, upon observation of performance of numerous polymer separation membranes, it has been revealed that most of the polymer separation membranes do not exhibit a performance higher than a certain level. That is, for a given permeability there exists an upper limit of selectivity, along which an inversely proportional relationship exists between the selectivity and the permeability all the time. The reason why such an upper limit exists is a natural result as the hard chains of a glass phase polymer substance screen the gas molecules. The slope of the upper limit has no relation to the chemical structure of the polymer separation membrane.

For the past 30 years, in order to simultaneously increase the selectivity and the permeability, most researchers in the separation membrane industrial field have directed their energy to synthesizing novel polymers (for example, see U.S. Pat. No. 5,725,633). However, though much research have been conducted, there has been no report of polymeric gas-separation membranes having a performance exceeding the existing upper limit. Very recently, we could make a polymeric-composite gas-separation membrane that has a selectivity going over the upper limit (see U.S. Pat. No. 6,517, 606B2). In that case, the permeability of the prepared composite membrane was found to be rather low for practical use for the gas separation process.

The present invention is directed to a fabrication process for a polymeric, gas or chemicals, separation membrane that can overcome such an upper limit on the basis of a novel concept of a polymer composite instead of synthesizing a new polymeric material. The prepared membrane has a permeability that is high enough for application in real processes.

Therefore, an object of the present invention is to provide a process for fabricating a polymer blend allowing a uniform dispersion and having an improved interface adhesion by adding a semi-crystalline polymer to an amorphous thermoplastic resin and at the same time, adding a compatibilizer so that the compatibilizer works at the interface of the semi-crystalline polymer and the thermoplastic resin to lower the interfacial tension, to provide a process for fabricating membranes with a desired thickness by performing extrusion and drawing, and to produce polymeric gas- or chemical-separation membranes exhibiting a high selectivity in such a manner that an almost impermeable semi-crystalline polymer is uniformly dispersed in the film and is formed in a thin and long plate type, working as an obstacle to chemical or gas permeation to change the curvature of diffusing molecules so that they pass through the channel at the interface where the compatibilizer is located and the mixed molecules are separated because of the interaction difference with the compatibilizer.

Another object of the present invention is to optimize dispersion of a semi-crystalline polymer by using an optimum amount of the compatibilizer.

Still another object of the present invention is to utilize a drawing process, for fabricating thin film membranes to let the dispersed phase have a different axial ratio.

Yet another object of the present invention is to provide a method for fabricating a semi-crystalline polymer blended high-selective gas separation membrane.

Still yet another object of the present invention is to provide a method for separating a gas or chemicals in the liquid state by using the semi-crystalline polymer blended high selective separation membrane. For the liquid separation process, the liquids do not dissolve the membrane or its components.

SUMMARY OF THE INVENTION

To achieve these and other advantages and in accordance with the purpose of the present invention, as embodied and broadly described herein, there is provided a semi-crystalline polymer blended gas separation membrane obtained by melting and processing a 50~99 wt % of thermoplastic resin, 1~50 wt % a semi-crystalline polymer and 0.1~10 wt % of compatibilizer for the semi-crystalline polymer and the amorphous (or very low crystalline) matrix polymer.

To achieve the above objects, a method for fabricating semi-crystalline polymer blended separation membranes is provided, including the steps of: mixing 50~99 wt % of thermoplastic resin, 1~50 wt % semi-crystalline polymer and 0.1~10 wt % of compatibilizer; and injecting the resulting mixture in an extrusion die and extending the exiting film to fabricate an axially oriented film.

The foregoing and other objects, features, aspects and advantages of the present invention will become more apparent from the following detailed description of the present invention when the accompanying drawings are taken into consideration.

As will be described below, the thin semi-crystalline polymer blended gas separation membranes fabricated in accordance with the present invention have many advantages.

For example, first, it exhibits a high selectivity exceeding the limit value, which hardly has been overcome by existing separation membranes. Also, it exhibits a permeability that is high enough for use in practical gas separation processes.

Secondly, as a separation membrane fabricating technique with a novel concept combining a physical method and a chemical method, since the whole process is performed in the extruder, it does not require a complicated process, such as a solution casting method, a post-treatment process, such as a solvent recovery and processing, is not necessary, and it is also possible to make separation membranes in large scale.

Thirdly, since it can be used between every crystalline polymer and thermoplastic resin, as long as a suitable compatibilizer is available, it can be used to separate gases having different permeation rates from mixtures. It can also be used to separate liquid chemicals as long as they do not dissolve the membrane components.

BRIEF DESCRIPTION OF THE DRAWINGS

The accompanying drawings, which are included to provide a further understanding of the invention and constitute a part of this specification, illustrate embodiments of the invention and together with the description serve to explain the principles of the invention.

In the drawings:

The top row in FIG. 1 includes photographs of a scanning electron microscope (SEM) of a section of a membrane generated in accordance with a preferred embodiment of the present invention, of which FIG. 1A is a SEM photo of a membrane section generated by binary blend system of semi-crystalline polymer (nylon6, 20 wt %)/poly(2,6-dimethyl-1,4-phenylene oxide) (PPO);

FIG. 1B is a SEM photo of a membrane section generated by ternary blend system of a semi-crystalline polymer (nylon-6, 20 wt %)/PPO/compatibilizer (2 wt %);

FIG. 1C is a SEM photo of a membrane section generated by ternary blend system of a semi-crystalline polymer (nylon6, 20 wt %)/PPO/compatibilizer (6 wt %); and FIG. 1D is a SEM photo of a membrane section generated by ternary blend system of a semi-crystalline polymer (nylon6, 20 wt %)/PPO/compatibilizer (10 wt %);

The bottom row in FIG. 1 includes photographs of a transmission scanning electron microscope (TEM) of a section of a membrane generated in accordance with a preferred embodiment of the present invention, of which FIG. 1A is a TEM figure of a membrane section generated by binary blend of a semi-crystalline polymer (20 wt %)/PPO;

FIG. 1B is a TEM figure of a membrane section generated by ternary blend of a liquid crystalline polymer (20 wt %)/PPO/compatibilizer (2 wt %);

FIG. 1C is a TEM figure of a membrane section generated by a ternary blend of a liquid crystalline polymer (20 wt %)/PPO/compatibilizer (6 wt %);

FIG. 1D is a TEM figure of a membrane section generated by a ternary blend of a liquid crystalline polymer (20 wt %)/PPO/compatibilizer (10 wt %); and FIG. 2 shows the relationship of oxygen permeability and the $N_2/O_2$ selectivity of the membranes prepared by using the present invention method.

DETAILED DESCRIPTION OF THE INVENTION

Reference will now be made in detail to the preferred embodiments of the present invention, examples of which are illustrated in the accompanying drawings.

A semi-crystalline polymer blended high selective gas separation membrane of the present invention comprises a semi-crystalline polymer, an amorphous (or very low crystalline) thermoplastic resin and a compatibilizer.

In the present invention, the semi-crystalline polymer is used in the amount of 1~50 wt %, preferably 5~25 wt %. All polymers containing some crystalline phase parts can be used for the present invention, but one having a high portion of crystalline phase, a low melting point, preferably lower than 300° C., and a lower melt viscosity than that of the matrix polymer (amorphous resin) at the processing temperature and conditions is more preferable.

In the present invention, the amorphous thermoplastic resin is used in an amount of 50~99 wt % and, preferably, 75~95 wt %, and it is preferred that it does not decompose at a process temperature that is not lower than the melting temperature of the semi-crystalline polymer. In this respect, the melt viscosity is preferred to be higher than that of the semi-crystalline polymer for better deformation of the dispersed phase, though not necessarily required. In the present invention, any commercial thermoplastic resin can be used. In this respect, according to a preferred embodiment of the present invention, poly(2,6-dimethyl-1,4-phenylene oxide) (PPO) (a product of G.E. of USA), provided a favorable result.

In the present invention, the compatibilizer is used in an amount of 0.1~10 wt %, preferably 0.1~5 wt %, and most preferably 1~2 wt %. The compatibilizer is positioned at the interface of the matrix resin and the semi-crystalline polymer, lowers the interfacial tension between the crystalline polymer and the matrix resin, improves dispersion, and strengthens interfacial adhesion.

It is preferred especially that the compatibilizer is not decomposed at the process temperature of the semi-crystalline polymer and the matrix resin, and is positioned at the interface of the dispersed phase to lower the interfacial tension and accordingly evenly disperse the dispersed phase, and improve the adhesion at the interface.

A compatibilizer used in the present invention can be any compound giving compatibility to the matrix thermoplastic resin and the semi-crystalline polymer. For example, it can be a block copolymer, a graft polymer or a copolymer generated by interfacial reaction. According to the preferred embodiment of the present invention, the compatibilizer, poly(styrene-co-maleic anhydride) provided a favorable result. It is well known that polystyrene forms a miscible blend with PPO and the amine end group of nylon 6 reacts with maleic anhydride. Thus the compatibilizer has a graft copolymer structure.

A process for preparing the semi-crystalline polymer blended high selective gas separation membrane includes the steps of: a) mixing 50~99 wt % of an amorphous thermoplastic resin, 1~50 wt % of a semi-crystalline polymer, and 0.1~10 wt % of compatibilizer based on a thermotropic liquid crystalline polymer; b) after passing through the extrusion die, the film was uni-(or bi-)axially drawn to produce an oriented composite film.

The semi-crystalline polymer blended in a high-selective gas-separation membrane produced by the present invention works as an obstacle to gas permeation, so that the gas molecules pass around the dispersed crystalline phase where the compatibilizer resides, and accordingly, the gas molecules interact with the compatibilizer, and the distance for the gas molecules to diffuse through is considerably increased.

The gas molecules normally diffused through the path of the free volume of the amorphous thermoplastic resin. In this respect, the diffusion coefficient is different depending on the size of the gas molecules, and thus, the diffusion flux becomes different. As the distance through which the gas molecules pass is elongated, the diffusion flux between the gas molecules are differentiated and, due to the interaction with the compatibilizer, there is a difference in the distance that the gas molecules diffuse per unit of time resulting in a high selectivity.

In the preparation method of the present invention, the mixing step may be performed by a general method, such as by using a twin screw extruder, single screw extruder and an internal mixer.

The drawing step in the preparation method of the present invention is conducted in a tensile apparatus connected to the extrusion die. The drawing can be biaxial drawing using simultaneous extension or a film blowing process, and the dispersed semi-crystalline phase has a stripe shape, of which a drawing ratio in the one axis direction is higher than a drawing ratio in the other direction.

When the film blowing process is applied, a dual mandrel of which outside and inside are rotated in the opposite directions may be used instead of the extrusion die so that the deformed semi-crystalline phase may be formed as a net shape. Or, a multilayer film composed of many layers may be fabricated by using a multilayer-coextrusion die.

The invention will be further illustrated by the following examples. It will be apparent to those having conventional knowledge in the field that these examples are presented only to explain the present invention more clearly, but the invention is not limited to the following examples.

As a semicrystalline polymer, a raw material, nylon 6 (KOLON 171, Korea) was used. As a matrix resin, poly(2,6-dimethyl-1,4-phenylene oxide) (PPO) (a product of G.E. of USA) was used. As a compatibilizer, a random copolymer between styrene and maleic anhydride, polystyrene-co-maleic anhydride), containing 7 wt % of maleic anhydride was used.

After nylon 6, PPO and the compatibilizer were dried in a vacuum oven at a temperature of 100° C. for more than 24 hours, they were premixed with the ratio in Table 1. The resulting mixture was then extruded at a process temperature of 240° C. in a Bravender twin screw extruder. It is well known that polystyrene is miscible with PPO and amine group of nylon 6 reacts with maleic anhydride group very well. Thus while mixed and blended in the extruder, the random block copolymer reacts with nylon 6 to form a graft copolymer. This graft copolymer should be located at the interface due to enthalpic and entropic interaction with the matrix (PPOO and the dispersed phase (nylon 6). Polystyrene section of the compatibilizer would be in the matrix side while grafted polyamide parts reside in the dispersed nylon 6 phase. Thus, interfacial adhesion is enhanced while the interfacial tension between those two phases is significantly reduced.

A flat die was connected to an exit of the twin screw extruder and the blend was subjected to an extension with a drawing unit. The extension ratio was adjusted with the rate of the winding speed to obtain a thin film of a uniform thickness. After then the film was wound. A film with an even thickness of 100 mm having a 3% error limit was used.

After the film samples were installed in a testing container, and an absorption gas was discharged under a high vacuum ($10^{-6}$ torr) before measuring the permeation rate. In the testing apparatus, an isometric method was used in which a pressure increase in the side opposite the side where a pressure was not applied was measured. The related process is described in detail in ASTM D1434-82.

An experiment was performed for the separation of oxygen and nitrogen which are most difficult to separate among the gases. The reason for this is that kinetic diameters of oxygen molecule and nitrogen molecule are respectively 3.46 and 3.64 Å, having little difference from each other. The feasibility of this mechanism can be confirmed by measuring the permeability of $CO_2$ ($P_{CO_2}$) and the selectivity of $\alpha_{CO2/N2}$. In the experiment, the upstream pressure was 1 atm and the temperature was maintained at 35° C.

In order to compare the separation capability of the three-component blend film of the present invention and a simple film (a test sample 2) made under the same condition but by mixing only two components, i.e., PPO and semi-crystalline polymer (nylon 6) without using the compatibilizer, the respective permeability and selectivity of ternary blend film were also measured. The results are shown as follows in Table 1.

TABLE 1

Permeabilities and selectivities at 35° C.

| No. | Films | $P_{O2}$ (Barrer)[a] | $P_{N2}$ (Barrer) | $P_{CO2}$ (Barrer) | $\alpha$ ($P_{O2}/P_{N2}$) | $\alpha$ ($P_{CO2}/P_{N2}$) |
|---|---|---|---|---|---|---|
| 1 | PPO | 16.8 | 4.1 | 61 | 4.4 | 14.4 |
| 2 | PPO/NY (20%) | 7.32 | 1.53 | 24.8 | 4.77 | 16.15 |
| 3 | PPO/NY (20%)/PSMA (2%) | 3.02 | 0.309 | 12.0 | 9.75 | 38.7 |

TABLE 1-continued

Permeabilities and selectivities at 35° C.

| No. | Films | $P_{O2}$ (Barrer)[a] | $P_{N2}$ (Barrer) | $P_{CO2}$ (Barrer) | $\alpha$ ($P_{O2}/P_{N2}$) | $\alpha$ ($P_{CO2}/P_{N2}$) |
|---|---|---|---|---|---|---|
| 4 | PPO/NY (20%)/PSMA (4%) | 4.06 | 0.474 | 17.0 | 8.56 | 35.87 |
| 5 | PPO/NY (20%)/PSMA (6%) | 3.29 | 0.469 | 12.9 | 7.01 | 27.43 |
| 6 | PPO/NY (20%)/PSMA (10%) | 2.65 | 0.325 | 11.1 | 8.15 | 34.22 |

[a] 1 Barrer = $10^{-10}$ cm$^3$(STP)cm/(cm$^2$s cmHg)

In the case where a film is fabricated by adding the semi-crystalline polymer into PPO, the permeation rate was reduced somewhat due to the addition of the crystalline phase having less free volume, but its selectivity was increased.

The results of ternary blend systems depend on the amount of the compatibilizer.

When 2 wt % of compatibilizer was added (test sample 3), as shown in FIG. 1B, the semi-crystalline polymer (nylon 6) was uniformly and finely dispersed in the matrix resin, PPO. Its size was remarkably reduced. Though the permeation rate was reduced, the selectivity was significantly increased. The selectivity at this time exhibits a higher value than a limit value of the existing separation membranes (see FIG. 2).

Meanwhile, in the case where an excess amount of compatibilizer was added (test sample 4 and 5), the selectively was decreased. This difference results from the fact that, as shown in FIG. 1B, in the case where a suitable amount of compatibilizer is introduced, the size of the dispersion phase was rapidly reduced compared to the case of the binary system and was evenly dispersed. While, as shown in FIGS. 1C and 1D, if the compatibilizer is added in an excess amount, it forms its own phase and surrounds the periphery of the dispersed phase and, accordingly, the dispersed phase is coagulated.

In the case of a three component blend (sample 3) showing a uniform dispersion, as aforementioned, the permeating gas molecules should pass the boundary portion of the impermeable semi-crystalline polymer, of which the distance is proportionate to the square root of the number of dispersed phase, so that the path is far more lengthened. The path around the semi-crystalline polymer is occupied by the compatibilizer, which interacts differently for different gas molecules (oxygen and nitrogen).

Accordingly, a small difference in the diffusion constant translates as a large difference in the permeation rate of oxygen and nitrogen as the gas molecules pass the long distance and receive different interactions from the compatibilizer, resulting in oxygen passes easily, and thus, high permeation rate and selectivity of oxygen are obtained. This is similar to the separation principle of gas chromatography.

On the other hand, in the case where an excessive amount of compatibilizer was introduced, the path length is reduced due to the coagulation of dispersed phase and the interaction with the compatibilizer also is decreased, resulting in a lowering of the selectivity. When an excessive amount of the compatibilizer was added, it forms its own phase and the selectivity was increased slightly because the selectivity of the film made of solely compatibilizer for $O_2/N_2$ pair is relatively high.

In the present invention, PPO was used as a matrix, mixed with a polyamide (nylon 6), to which a random block copolymer of styrene and maleic anhydride was added as the compatibilizer, thereby fabricating the extended film after die exit. In view of the morphology of the extended film, the dispersed phase and the interfacial adhesion were confirmed by electronic microscopy. In addition, by separating oxygen and nitrogen, which are the most difficult to be separated as their molecular sizes are similar, the performance of the film was measured.

The feasibility of this mechanism can be confirmed by measuring the permeability of $CO_2$ ($P_{CO2}$) and the selectivity of $\alpha_{CO2/N2}$. The results are shown in Table 1. The behavior of $P_{CO2}$ and $P_{CO2/N2}$ vs $P_{CO2}$ follows exactly that of $P_{O2}$ and $\alpha_{O2/N2}$. Addition of the semi-crystalline Ny6 phase into PPO (binary blend film) decreases $P_{CO2}$ compared to that of a PPO film whereas it increases the selectivity $a_{O2/N2}$ somewhat. The selectivity of the ternary blend film containing 2 wt % PSMA shows a remarkable increase. Though the permeability decreased somewhat, the selectivity increased more than twice of that of the binary blend film. Permeability of this film is high enough (12 Barrer) to be used for the removal of $CO_2$. Addition of more compatibilizer leads to coalescence of dispersed Ny6 phase (FIG. 1). Then, the selectivity $\alpha_{O2/N2}$ decreased while the permeability $P_{CO2}$ increased. Further addition of PSMA results in the formation of PSMA own phase. High selectivity of PSMA ($\alpha_{O2/N2}$ of PSMA is 34.64) and low permeability compared to that of PPO ($P_{CO2}$ of PSMA is 10.8) bring in lower $P_{CO2}$ and high $\alpha_{O2/N2}$. After each passage through the compatibilizer around a dispersed phase, the concentration of $CO_2$ would go up and up and high selectivity is achieved. This result confirms the role of the compatibilizer acting as an organic molecular sieve for selection of gas molecules.

As so far described, the thin semi-crystalline polymer blended gas separation membranes fabricated in accordance with the present invention have many advantages.

For example, first, it exhibits the high selectivity exceeding the limit value, which hardly has been overcome by existing separation membranes. Also, the permeability is high enough to be used in practical gas separation processes.

Secondly, as a separation membrane fabricating technique with a novel concept combining a physical method and a chemical method, since the whole process is performed in an extruder, it does not require a complicated process, such as a solution casting method, a post-treatment process, such as solvent recovery and processing, is not necessary, and it is also possible to make separation membranes in large scale.

Thirdly, since it can be used between every crystalline polymer and thermoplastic resin as long as a suitable compatibilizer is available, it can be used to separate gases having different permeation rate from mixtures. It can also be used to separate liquid chemicals as long as they do not dissolve the membrane components.

Through the present inventors used a single extruder for a monolayer film, it can be extended to multiple layer extruder. Also it can be easily modified to have a film-blowing die after the extruder to produce a blown film. Also, a pair of counter rotating mandrels for the extrusion die in the film blowing process can be adopted, so that it is possible to produce a membrane in which the dispersed crystalline phases are declined to 45° with each other (inside and outside).

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

Here we applied the idea of present invention to prepare a polymer composite film for gas separation. However, it can be applied easily to any membrane used in the chemical mixture separation process, such as reverse osmosis, drug delivery, drug release, artificial kidney, and artificial lung to name a few, as well as to liquid separation. Thus any separation process using the composite polymer film of this invention should also be embraced by the appended claims.

The invention claimed is:

1. Polymer composite including a compatibilizer and having selective permeability to chemical permeants due to interaction differences between the compatibilizer and the chemical permeants, the polymer composite comprising:
    50-99 wt % of an amorphous (or low crystalline) thermoplastic resin as a matrix resin selected from the group consisting of polyethylenepropylendienterpolymer, poly(1-(trimethylsilyl)-1-propyne), -amorphous nylon, polystyrene and polycarbonate;
    0.9-50 wt % of a semi-crystalline polymer selected from the group consisting of polyamide (nylons), polyethylene terephthalate, polybuthylene terephthalate, polyethylene, polypropylene, polyetheretherketone, polyvinylidene fluoride, polytetrafluoroethylene, polyphenylene sulfide, thermotropic liquid crystal polymer, and lyotropic liquid crystal polymer, and dispersed in the amorphous thermoplastic resin to provide a dispersed phase having an interface with the amorphous thermoplastic resin; and
    0.1-10 wt % of a compatibilizer consisting of a block copolymer or a graft copolymer having compatibility or compatibility generated by interfacial reaction, being selected from the group consisting of poly(styrene-co-maleic anhydride), random or block copolymer of styrene and maleic, polystyrene whose oxazoline group is substituted, amorphous polymer added with a maleic anhydride group, polycarbonate having a reaction group, and polystyrene having a reaction group, and positioned at the interface of the dispersed phase with the amorphous thermoplastic resin, and having different interactions with different chemical permeants so that the selective permeability of the polymer composite is affected.

2. The polymer composite according to claim 1, wherein the amorphous thermoplastic resin is present in an amount of 75-95 wt %, the semi-crystalline polymer is present in an amount of 4.9-25 wt %, and the compatibilizer is present in an amount of 0.1-5 wt %.

3. The polymer composite according to claim 1, wherein the semi-crystalline polymer has low gas permeability irrespective of degree of crystallinity and is selected from the group consisting of polyamide (nylons), polyethylene terephthalate, polyethylene, polypropylene, polyetheretherketone, polyvinylidene fluoride, polytetrafluoroethylene, polyphenylene sulfide, thermotropic liquid crystal polymer, and lyotropic liquid crystal polymer.

4. The polymer composite according to claim 1, wherein the compatibilizer is positioned at the interface between the amorphous thermoplastic resin and the semi-crystalline polymer to lower interfacial tension there between so that dispersion is improved, interfacial adhesion is strengthened, and interaction with diffusing gas molecules varies to vary respective gas diffusion rates.

5. A method for preparing a film from the polymer composite claimed in claim 1, comprising the step of:
    a. forming a melt blend by mixing the thermoplastic resin, the semi-crystalline polymer and the compatibilizer; and
    b. axially drawing the melt blend obtained from step (a) using an extension apparatus or film blowing apparatus connected to an extrusion die to fabricate a film,
    wherein the semi-crystalline polymer has a phase having a stripe shape in the film due to non-equal biaxial drawing, so that the film has greater extension in the vertical direction than in the horizontal direction.

6. A film prepared by the method claimed in claim 5.

7. The method according to claim 5, wherein the extrusion die has a dual mandrel of which inside and outside are rotated in opposite directions, so that a morphologically modified semi-crystalline phase is formed in a net shape.

8. A film prepared by the method claimed in claim 7.

9. The method according to claim 5, wherein the extrusion die is a multiple coextrusion dye, wherein the film is a multilayer film composed of a plurality of layers that is fabricated by using the multiple coextrusion die.

10. A film prepared by the method claimed in claim 9.

11. A gas separation method, comprising:
    providing a gas separation membrane comprised of the polymer composite of claim 1; and
    using the gas separation membrane to separate gases.

12. The polymer composite according to claim 1, wherein the amorphous crystalline polymer of the matrix resin has a higher melting point than that of the semi-crystalline polymer at the processing temperature.

13. An oriented film prepared from the polymer composite of claim 12.

14. Gas separation method, comprising:
    providing the oriented film of claim 13; and
    using the oriented film as a gas separation membrane.

15. The polymer composite according to claim 1, wherein the semi-crystalline polymer consists of one or more of said semi-crystalline polymer selected from the group consisting of polyamide (nylons), polyethylene terephthalate polybuthylene terephthalate, polyethylene, polypropylene, polyetherketone, polyvinylidene fluoride, polytetrafluoroethylene, polyphenylene sulfide, thermotropic liquid crystal polymer and lyotropic liquid crystal polymer.

16. A thin film that is a one layer thin film or a multilayer thin film comprising the polymer composite of claim 15.

17. A method of preparing the thin film of claim 16, comprising the step of:
    a. forming a melt blend by mixing thermoplastic resin, the semi-crystalline polymer and the compatibilizer; and
    b. axially drawing the melt blend obtained from step (a) using an extension apparatus or film blowing apparatus connected to an extrusion die to fabricate a film,
    wherein the semi-crystalline polymer has a phase having a stripe shape in the film due to non-equal biaxial drawing, so that the film has greater extension in the vertical direction than in the horizontal direction.

18. The method according to the claim 17, wherein the extrusion die has a dual mandrel of which inside and outside are rotated in opposite directions, so that a morphologically modified semi-crystalline phase is formed in a net shape.

19. The polymer composite according to claim 15, wherein the amorphous crystalline polymer of the matrix resin has a higher melting point than that of the semi-crystalline polymer at the processing temperature.

20. An oriented film prepared by the method of claim 17.

21. Gas separation method, comprising:
providing the oriented film of claim 20; and
using the oriented film as a gas separation membrane by passing gases through the oriented film to cause separation of the gases.

22. A polymer composite film for gas separation, wherein the semi-crystalline polymer of claim 1 has a thickness in nanometers.

23. A film according to claim 6 or 13, wherein the dispersed phase is composed of at least one inorganic material and the film includes a compatibilizer for the matrix resin and the dispersed phase.

24. Gas separation method, comprising:
providing the film of claim 23; and
using the film as a gas separation membrane by passing gases through the film to cause separation of the gases.

25. The polymer composite according to claim 1 or 2, wherein the compatibilizer is positioned at the interface by reaction with the matrix resin or the dispersed phase to form a copolymer.

26. A polymer composite gas separation membrane according to the claim 1, wherein the compatibilizer is positioned at the interface by reaction with the matrix resin or the dispersed phase to form a copolymer.

27. A film according to claim 20 or 23, wherein, when the matrix resin is PPO (poly(2,6-dimethyl-1,4-phenylene oxide) and the dispersed phase is polyamides, the compatibilizer is a random copolymer or a block copolymer of styrene and maleic anhydride.

* * * * *